(12) United States Patent
Tran

(10) Patent No.: US 12,268,128 B1
(45) Date of Patent: Apr. 8, 2025

(54) APPARATUS AND METHOD FOR DRYING ORGANIC MATERIAL

(71) Applicant: Johnson Tran, Foster City, CA (US)

(72) Inventor: Johnson Tran, Foster City, CA (US)

( * ) Notice: Subject to any disclaimer, the term of this patent is extended or adjusted under 35 U.S.C. 154(b) by 0 days.

(21) Appl. No.: 18/171,132

(22) Filed: Feb. 17, 2023

Related U.S. Application Data

(60) Provisional application No. 63/315,112, filed on Mar. 1, 2022.

(51) Int. Cl.
*A01F 25/12* (2006.01)
*A47F 5/08* (2006.01)

(52) U.S. Cl.
CPC ............ *A01F 25/12* (2013.01); *A47F 5/0876* (2013.01)

(58) Field of Classification Search
CPC ........ A01F 25/12; A01F 25/00; A22C 15/007; A47F 5/0006; A47F 5/0884; A47F 5/0892; A47F 2005/0012; A47F 7/06; A47F 5/0876; A47B 61/02
USPC ............ 211/113, 119.004, 125, 30, 204, 206
See application file for complete search history.

(56) References Cited

U.S. PATENT DOCUMENTS

| | | | | |
|---|---|---|---|---|
| 219,713 A | * | 9/1879 | Goodyear | A01F 25/12 211/113 |
| 285,159 A | * | 9/1883 | Reynolds | A01F 25/12 211/113 |
| 337,422 A | * | 3/1886 | Miller | A47F 5/0006 211/115 |
| 609,116 A | * | 8/1898 | McDonald | A47G 25/0685 211/100 |
| 623,377 A | * | 4/1899 | Leger | A47G 25/743 248/323 |
| 628,784 A | * | 7/1899 | Fitzgerald | A22B 5/06 452/187 |
| 784,070 A | * | 3/1905 | Rhoads | A47G 25/0692 211/115 |
| 878,271 A | * | 2/1908 | Blackford | A01F 25/12 211/113 |
| 918,196 A | * | 4/1909 | Price | A47F 7/163 211/45 |
| 1,005,870 A | * | 10/1911 | Packer | C25D 17/08 204/297.06 |
| 1,010,648 A | * | 12/1911 | Leffel | C25D 17/08 204/297.16 |
| 1,079,241 A | * | 11/1913 | Hertsgaard | A47G 25/743 40/657 |
| 1,079,513 A | * | 11/1913 | Reilly | A01F 25/12 211/125 |
| 1,083,994 A | * | 1/1914 | Darnieder | A01F 25/12 211/125 |
| 1,089,810 A | * | 3/1914 | Bain et al. | A01F 25/12 211/125 |
| 1,093,856 A | * | 4/1914 | Hurff | A01F 25/12 211/113 |

(Continued)

*Primary Examiner* — Jennifer E. Novosad

(74) *Attorney, Agent, or Firm* — Brooks Kushman P.C.

(57) ABSTRACT

A drying apparatus for organic material comprises a horizontal member with at least one vertical member suspended from it. At least one support member is substantially rigidly connected to the vertical member. The vertical member is selectively removable from the horizontal member. The support member protrudes out of the vertical member, and is able to carry the weight of organic material that is hung on it.

20 Claims, 5 Drawing Sheets

(56) References Cited

U.S. PATENT DOCUMENTS

| | | | | |
|---|---|---|---|---|
| 1,095,006 A | * | 4/1914 | Lowe | A01F 25/12 211/113 |
| 1,240,365 A | * | 9/1917 | Plumb | A01F 25/12 211/195 |
| 1,599,049 A | * | 9/1926 | Hartsook | A01F 25/12 34/107 |
| 1,611,397 A | * | 12/1926 | Wells | A01F 25/12 211/113 |
| 1,639,729 A | * | 8/1927 | Hill | A01F 25/12 211/125 |
| 1,896,654 A | * | 2/1933 | Weaton | A47G 25/1457 211/99 |
| D119,760 S | * | 4/1940 | Kopp | D6/572 |
| 2,709,005 A | * | 5/1955 | Eckstein | A47G 25/145 211/113 |
| 2,987,193 A | * | 6/1961 | Pajor | A47G 25/0685 211/89.01 |
| 2,994,437 A | * | 8/1961 | Nyitrai | A47C 7/64 211/30 |
| 3,178,033 A | * | 4/1965 | Wirsing | A47K 10/14 D6/326 |
| 3,312,434 A | * | 4/1967 | Simon | A61B 1/00117 248/62 |
| 3,498,469 A | * | 3/1970 | Hummel | A47F 5/0884 211/85.15 |
| 4,034,865 A | * | 7/1977 | Batts | A47F 7/19 224/927 |
| 4,673,153 A | * | 6/1987 | Hilty | A47F 7/06 D6/326 |
| 4,872,568 A | * | 10/1989 | Lehmann | A47G 25/1457 211/113 |
| 4,872,963 A | * | 10/1989 | Van Horn | C25D 17/08 118/503 |
| 4,903,846 A | * | 2/1990 | Smith | A47F 5/0892 211/113 |
| 4,938,368 A | * | 7/1990 | Sharman | A47F 5/0876 211/85.15 |
| 5,020,677 A | * | 6/1991 | Wirth | B05B 13/02 204/297.09 |
| 5,118,065 A | * | 6/1992 | Becklund | A47G 25/06 248/231.51 |
| D328,193 S | * | 7/1992 | Gossett | D6/513 |
| 5,199,580 A | * | 4/1993 | Bankier | B65G 17/20 211/113 |
| 5,294,005 A | * | 3/1994 | Hedges | A63B 71/0045 294/143 |
| 5,515,978 A | * | 5/1996 | Moran | A47G 25/18 211/89.01 |
| 5,601,197 A | * | 2/1997 | Baxter | A47F 5/0892 211/115 |
| 5,823,360 A | * | 10/1998 | Gorosave | A63B 71/0036 211/74 |
| 6,006,929 A | * | 12/1999 | Leonard | A47F 5/112 211/113 |
| 6,340,091 B1 | * | 1/2002 | Romeo | A47F 5/0884 211/113 |
| 7,040,517 B1 | * | 5/2006 | Swanson | A47F 7/06 223/85 |
| 7,051,886 B1 | * | 5/2006 | Han | C11D 17/041 211/85.12 |
| 7,395,937 B2 | * | 7/2008 | Sliwowski | A47F 5/0884 211/106.01 |
| D578,312 S | * | 10/2008 | Belokin | D6/323 |
| D580,661 S | * | 11/2008 | Belokin | D6/323 |
| D582,686 S | * | 12/2008 | Belokin | D6/323 |
| 7,481,340 B2 | * | 1/2009 | Murphy | A47G 25/743 211/85.3 |
| 7,641,061 B1 | * | 1/2010 | Cuzzocrea | A47F 5/083 211/113 |
| 7,798,463 B2 | * | 9/2010 | Morgenroth | A47F 5/0846 211/106.01 |
| 7,810,654 B1 | * | 10/2010 | Wang | A47G 25/06 211/106.01 |
| D653,462 S | * | 2/2012 | Trexler | D6/323 |
| 8,177,075 B2 | * | 5/2012 | Hathorn | A47F 5/0006 211/85.3 |
| 8,783,475 B2 | * | 7/2014 | Carver | A45C 3/12 211/195 |
| 8,915,384 B2 | * | 12/2014 | Immerman | A47G 25/0614 211/119 |
| D811,754 S | * | 3/2018 | Heroux | D6/315 |
| D818,724 S | * | 5/2018 | Davison | D6/323 |
| 9,962,990 B2 | * | 5/2018 | Russell | B44C 5/06 |
| 10,034,561 B2 | * | 7/2018 | Horton | G09F 11/12 |
| D878,100 S | * | 3/2020 | Liu | D6/323 |
| 2014/0353267 A1 | * | 12/2014 | Knutson | A47G 29/06 211/113 |
| 2019/0142197 A1 | * | 5/2019 | McClendon | A47B 61/02 248/295.11 |
| 2021/0094756 A1 | * | 4/2021 | Larkins | A47B 96/14 |

\* cited by examiner

APPARATUS AND METHOD FOR DRYING ORGANIC MATERIAL

RELATED U.S. APPLICATION DATA

This application is a non-provisional of, and claims the benefit and priority from, U.S. Provisional Application Ser. No. 63/315,112, which was filed on Mar. 1, 2022. The entire contents of that Provisional Application are incorporated herein by reference.

FIELD OF INVENTION

This invention concerns the field of organic material processing. More specifically, this invention relates to drying plants.

BACKGROUND

Organic material generally needs to be processed in order to prepare if commercially for its intended use. Organic material that needs processing includes plants, crops, animal byproducts, etc.

Among the various types of organic material processing, one process comprises drying, or dehydrating, the organic material. This process essentially comprises extracting and removing moisture, or water content, from the organic material. Drying organic material provides various commercial advantages, such as to extend the organic material's shelf life in order to give producers and sellers more time to market and sell the product to consumers.

Many methods and apparatus are known in the art for drying organic material. These may include, for example, subjecting the organic material to heaters, fans, sunlight, and the like. One known method is to hang plants, i.e. to suspend them in the air to allow the plants to air dry. That air drying process may be accelerated by exposing the hanging plants to heat, or to air blowing from a fan, etc. But the plants suspended in the air tend to be susceptible to drying by virtue of air-drying from the ambient air alone.

Many apparatus and methods are known in the art for hanging organic material, such as plants, for drying purposes. These include, for example, nets, lattice structures, and the like. However, such methods and apparatus tend to be cumbersome and difficult to use. Nets make it difficult to access the organic material spread across a net. Lattice structures can be fragile and break during use. These apparatuses may be dangerous as well, potentially resulting in falls and injuries to the personnel performing the work, especially if the organic material is suspended at a height. Further, these apparatuses may be difficult and cumbersome for storage during non-use.

Accordingly, there is a need for a simpler, safer, and more reliable method and apparatus for drying organic material that is conveniently storable during non-use.

COPYRIGHT NOTICE

@ 2020 Johnson Tran. This patent document includes material that is subject to copyright protection. The copyright owner consents to fair use by facsimile reproduction of the patent document or of the patent disclosure as it appears in the U.S. Patent and Trademark Office's records. Apart from that, all copyright rights to the disclosure herein are expressly reserved. 37 CFR § 1.71 (d).

SUMMARY OF THE INVENTION

A drying apparatus for organic material comprises a horizontal member. At least one vertical member is suspended from the horizontal member, and at least one support member is substantially rigidly connected to the vertical member. The vertical member is preferably selectively removable from the horizontal member, and is preferably slidable with respect to the horizontal member.

The support member protrudes out of the vertical member, and is able to carry the weight of organic material, such as plants, that may be hung from it.

In other embodiments, a plurality of vertical members are suspended from the horizontal member. Each vertical member has at least one support member that is substantially rigidly connected to it. Each support member protrudes out of its respective vertical member, and is able to carry the weight of organic material, such as plants, that are hung from it. All of the plurality of vertical members are preferably selectively removable from the horizontal member, and all of the plurality of vertical members are preferably slidable with respect to the horizontal member.

The vertical member may be suspended from the horizontal member with an S-hook. The support members may be a C-shaped hook.

In one embodiment, the vertical member comprises a plurality of telescoping members that telescopically slide with respect to each other. The telescoping members preferably lock selectively with respect to each other.

In another embodiment, the vertical member comprises a plurality of separate sections that interconnect with each other. The separate sections may threadedly interconnect with each other in one embodiment.

Organic material, such as plants, can be hung on the support member, such as for air-drying. An additional apparatus, such as a fan or a heater, or both, may compliment that air-drying process.

BRIEF DESCRIPTION OF THE FIGURES

The invention can be better understood with reference to the figures. In these figures, like reference numerals designate corresponding parts throughout the different figures and views.

DETAILED DESCRIPTION

The systems, methods, and apparatus of the present invention are described below with reference to the figures. The description and figures are for illustrative purposes only, they do not limit the true scope and spirit of the present invention. The true scope and spirit of the present invention is evidenced by all parts of this disclosure, including the summary, the figures, the detailed description, the claims, and the abstract, along with equivalents thereof.

Figure 1:
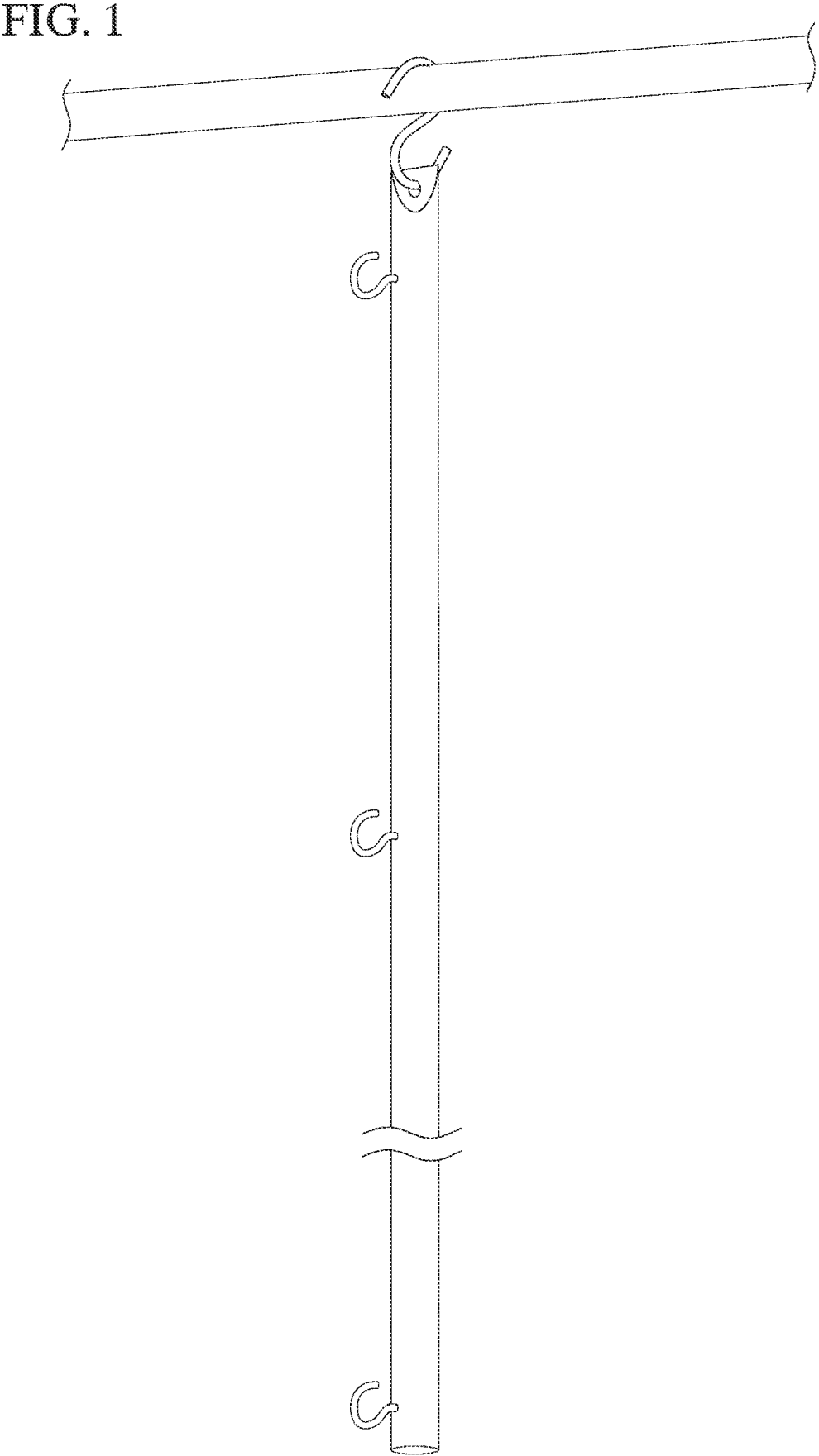
FIG. 1 shows a hanging apparatus according to one embodiment of the present invention.

FIG. 1 shows a hanging apparatus 10 according to one embodiment of the present invention. Hanging apparatus 10 comprises at least one vertical member 12. It is, however, anticipated that a typical implementation of hanging apparatus 10 will comprise a plurality of vertical members 12. In one embodiment, hanging apparatus 10 comprises four vertical members 12. It is anticipated that the exact construction, dimensions, and performance of the vertical members 12 will vary by embodiment, provided that they are operable to serve the purposes of the present invention.

Each vertical member 12 in a particular embodiment may be identical, or they may vary from each other. It is anticipated that the design, construction, and implementation of the vertical members 12 in a particular embodiment will correspond to the requirements of that particular embodiment. It may even depend on the plants, or organic material, that are expected to be dried in that particular embodiment. The implementation of the same or of different vertical members 12 in an embodiment is therefore anticipated, and all such embodiments are intended to be covered by the present claims.

The shape of vertical members 12 is elongate, but the shape of their cross-section may vary. The cross-section may be round, elliptical, oval, square, rectangular, triangular, an angle iron, or the like. Further, the size of the cross section may vary from one embodiment to another, and will typically depend on the performance requirements of the respective implementation. In one embodiment, the vertical members 12 are pipes with a hollow interior and a round cross section. In another embodiment, vertical members 12 are PVC pipes, which are known in the art. In another embodiment, vertical members 12 are hollow metallic pipes.

Figure 2:
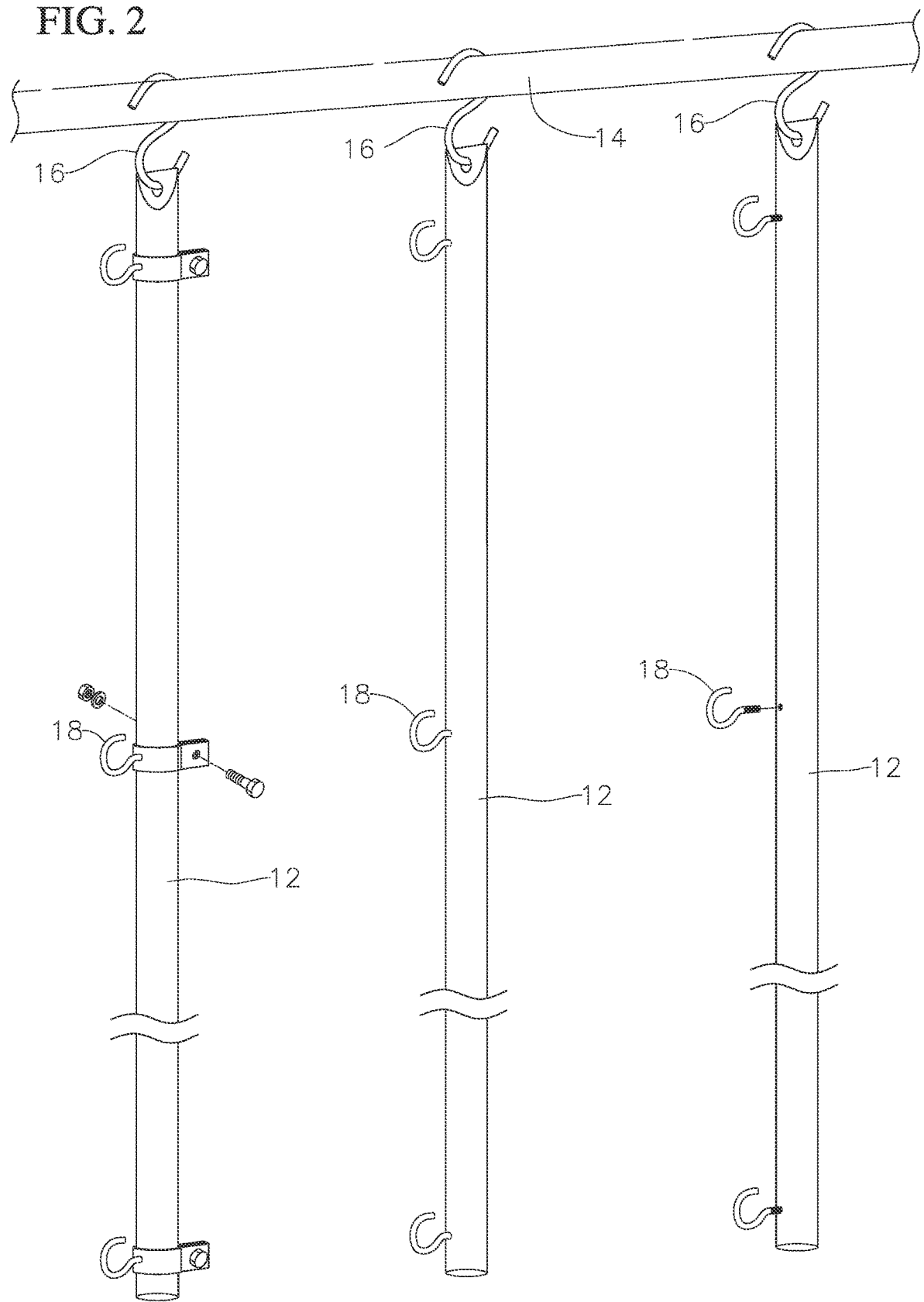
FIG. 2 shows one vertical member hanging on a horizontal member in the hanging apparatus of FIG. 1.

FIG. 2 shows a zoomed-in view of a vertical member 12 suspended from a horizontal member 14 in hanging apparatus 10. Horizontal member 14 may be of any shape or construction known in the art, or which may hereafter be invented, that is operable to support one or more vertical members 12 suspended therefrom. It is, therefore, anticipated that horizontal member 14 will be adequately strong to support the weight of a plurality of vertical members 12 suspended therefrom plus the weight of organic material, such as plants, hung from the vertical members 12. In this regard, horizontal member may have any dimensions and cross section, and may be made of any material. In one embodiment, horizontal member 14 is a hollow rod made of metal, about 1 inch in diameter. In an alternate embodiment, horizontal member 14 is a track similar to tracks used in the art for hanging drapes, where the drapes are slidable on the track. In such embodiment, it is anticipated that the vertical members 12 suspended from the horizontal member 14 are slidable with respect to the horizontal member 14. In another alternate embodiment, horizontal member 14 may be a rod, such as a metallic rod, with vertical members 12 suspended therefrom with rings that encircle the rod, akin to a shower curtain slidably implemented on shower curtain rod with rings that encircle the shower curtain rod, which are known in the art. All variations in horizontal member 14 are anticipated and are intended to be covered by the present claims.

Vertical members 12 are suspended from, or hang from, the horizontal member 14. This may be accomplished via any mechanism or apparatus known in the art, or which may hereafter be invented. However, in each embodiment, it is preferable that the vertical members 12 are selectively removable from horizontal member 14. In such implementation, those skilled in the art will recognize that the vertical members 12 may be selectively implemented on horizontal member 14 during use in hanging apparatus 10, and be selectively removed from horizontal member 14 during non-use, such as for storage purposes.

In one embodiment, vertical member 12 is suspended from horizontal member 14 by a suspension member 16, such as an S-hook. S-hooks are known in the art. The suspension member 16 connects to both, the horizontal member 14 and the vertical member 12, as shown in FIG. 2. The suspension member 16 is preferably strong enough to support the weight of the corresponding vertical member 12 that is suspended therefrom, plus the weight of any organic material, such as plants, that may be hung from the corresponding vertical member 12.

Referring to FIG. 2, one or more support members 18 are implemented on vertical member 12. A vertical member 12 may comprise any number of support members 18, which are preferably spaced apart from each other. In one embodiment, vertical member 12 is about 8 ft in length and comprises support members 18 that are spaced 1.5 ft apart along the elongated length of the vertical member 12.

The support members 18 serve to allow organic material, such as plants, to be hung therefrom. During such use, the weight of the organic material hung from a support member 18 will be supported by the support member 18. Further during such use, the organic material will be suspended in mid air and be exposed to the ambient air for purposes of air-drying.

In an embodiment with a plurality of support members 18 on one vertical member 12, those skilled in the art will recognize that a plurality of organic material, such as plants, may be hung from one vertical member 12 across the different support members 18 on that vertical member 12.

Support member 18 is preferably relatively rigidly attached to the vertical member 12. In one embodiment, support member 18 has threads whereby it can threadedly engage with corresponding threads implemented in vertical member 12. In an alternate embodiment, support member 18 threadedly engages into a cavity, such as a hole, in vertical member 12.

Support member 18 is a C-shaped hook in one embodiment. It is anticipated, however, that in alternate embodiments support member 18 may have any shape that can serve to hang organic material, such as plants, with respect to the vertical member 12. In this regard, support member 18 may be straight in shape, protruding outward from a vertical member 12. In another embodiment, support member 18 may be an angled arm that sticks out at an upward angle from vertical member 12. Thus, support member 18 may be of any shape or size while remaining within the spirit and scope of the present invention, and therefore its shape, size, and dimensions are expected to vary by embodiment. All such varying embodiments are anticipated and are intended to be covered by the present claims.

Support member 18 may be designed to be selectively adjustable with respect to its vertical member 12. For example, support member 18 may be relatively rigidly attached to a clamp that can be loosened or tightened with respect to vertical member 12 by loosening or tightening bolts on the clamp. Such clamps designed to crimp around the circumference of a pole are known in the art. Those skilled in the art will recognize that in such embodiment the position of support members 18 on the vertical support member 12 can be adjusted in accordance with the needs of the respective implementation of the particular hanging apparatus 10.

Figure 5:
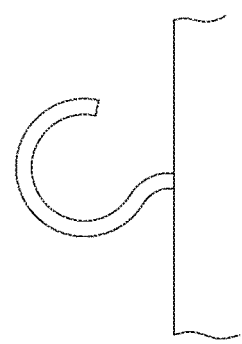
FIG. 5 shows a a C-hook shaped support member in the hanging apparatus of FIG. 1.

In one embodiment, at least one support member 18 is a C-shaped hook as shown in FIG. 5. The C-shape of the hook curves and extends past the vertical, or the 12:00 o'clock position in the C part of the hook. Those skilled in the art will recognize that this shape helps prevent organic material, such as plants, from slipping off or sliding out from support member 18 while they are hung therefrom.

Figure 3:
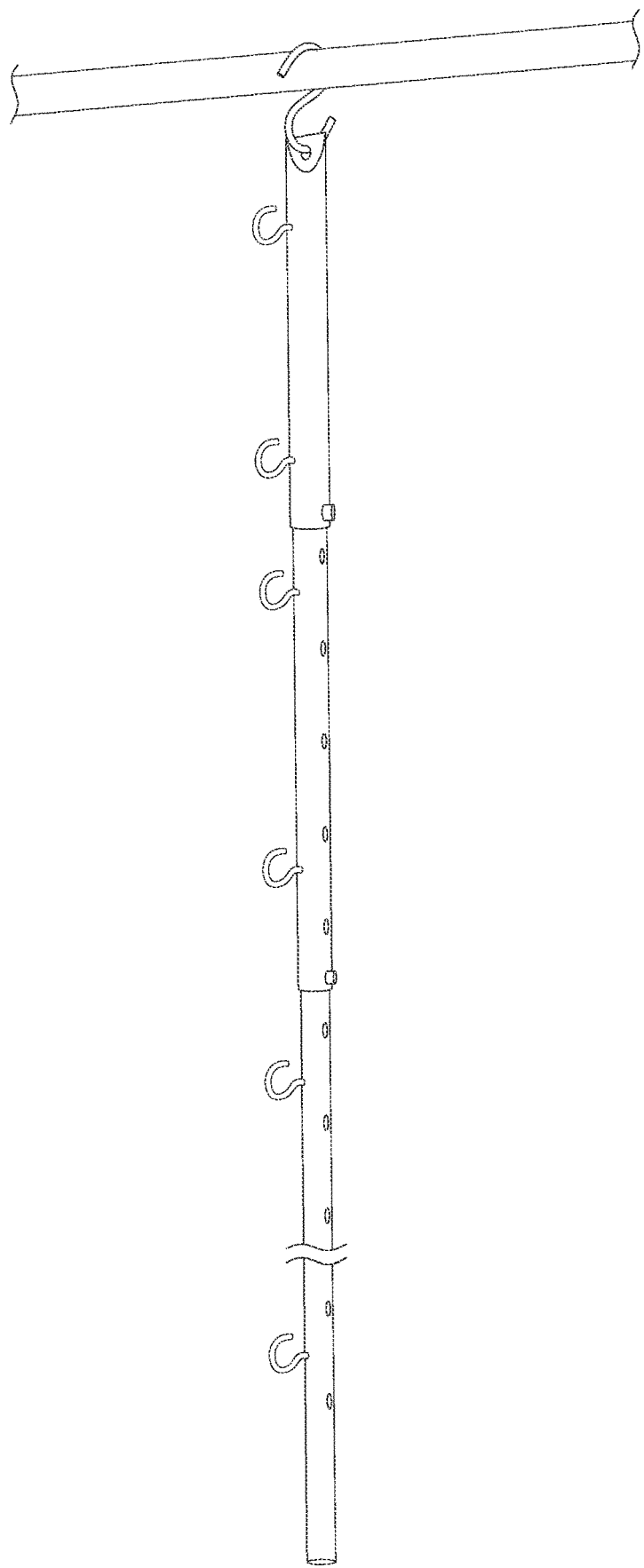
FIG. 3 shows an alternate embodiment of a vertical member in the hanging apparatus of FIG. 1.

FIG. 3 shows an alternate embodiment of vertical member 12 in the hanging apparatus 10. The body of vertical member 12 in this embodiment has one or more telescoping members. Those skilled in the art will appreciate that a telescoping feature allows the vertical member 12 to be extended or retracted selectively, whereby its length can be lengthened or shortened as desired, to customize the vertical member's 12 length to suit the needs of the particular implementation of hanging apparatus 10. This embodiment of vertical member 12 preferably also comprises a button that is operable to selectively lock the positions of the telescoping members with respect to each other. In such locked configuration, the telescoping members will not slip or slide with respect to each other during use with hanging organic material. Elongate telescoping devices are known in the art, wherein the telescoping members lock with respect to each other with a button in one telescoping member that engages with a corresponding hole in another telescoping member.

Figure 4:
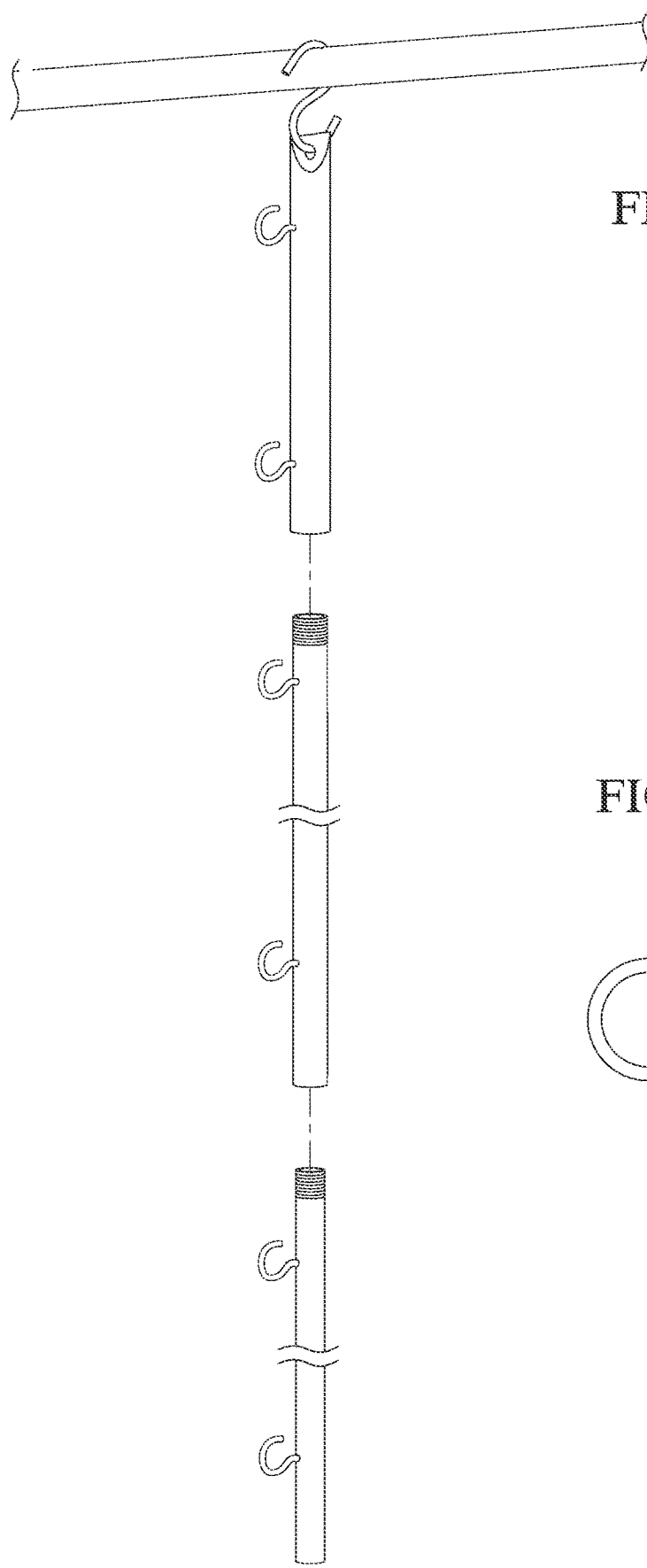
FIG. 4 shows another alternate embodiment of a vertical member in the hanging apparatus of FIG. 1.

FIG. 4 shows another alternate embodiment of a vertical member 12 in hanging apparatus 10. This embodiment of vertical member 12 comprises one or more elongate sections 22 that cooperatively engage with each other, such as with corresponding threads on the elongate sections 22. The length of each section 22 may vary from embodiment to embodiment, and is 1.5 ft each in one embodiment. Those skilled in the art will recognize that the overall length of the vertical member 12 in this embodiment may be selectively adjusted by adding or removing sections 22, by threading or de-threading the sections 22 with respect to each other.

Figure 6:
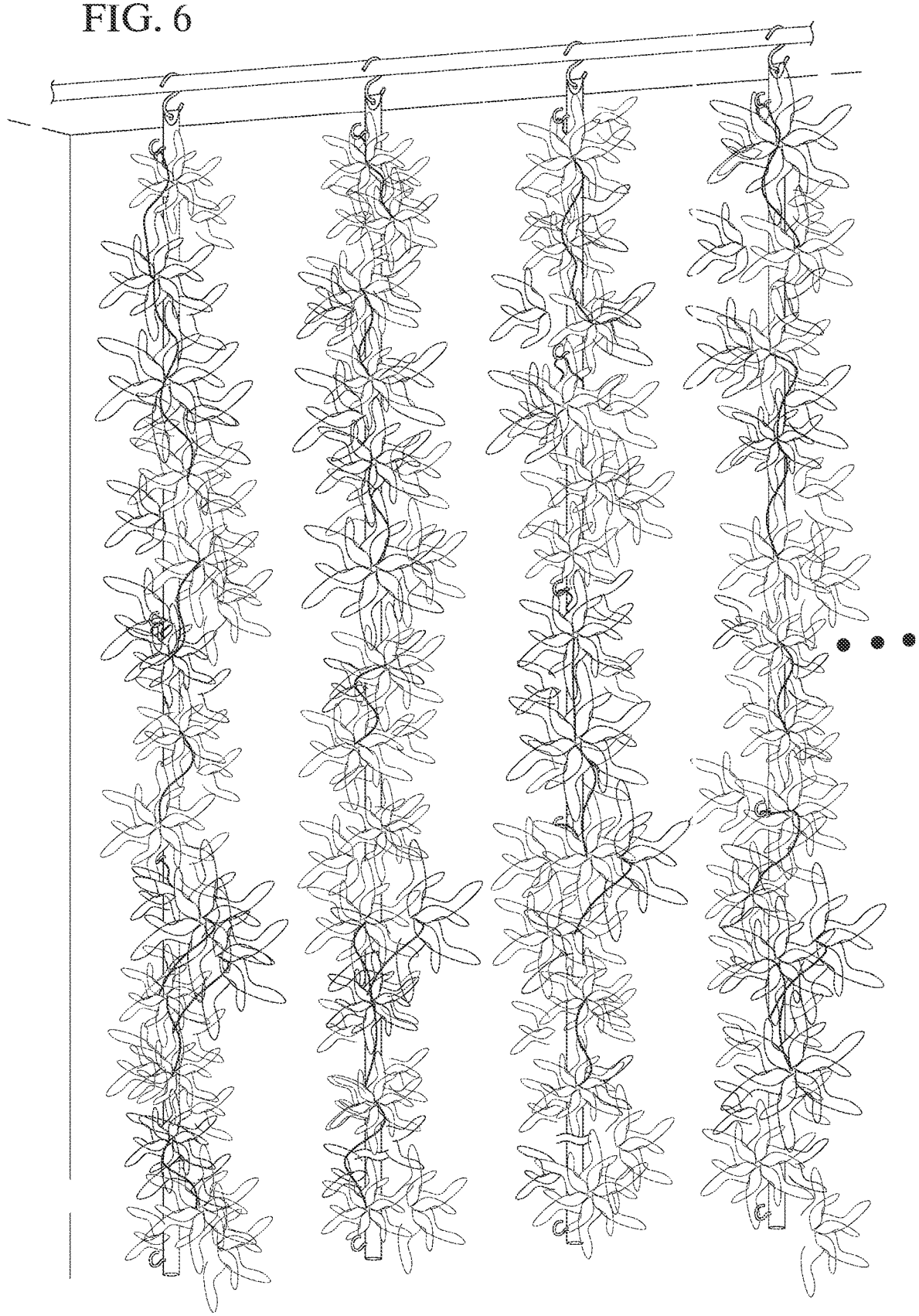
FIG. 6 shows organic material hanging on the hanging apparatus of FIG. 1.

FIG. 6 shows an implementation of hanging apparatus 10 with organic material hanging on it. In this depiction, the organic matter comprises plants. In one embodiment, the plants are marijuana plants. The plants are hung from the apparatus 10 on support members 18 on vertical members 12. The support members 18 are mostly hidden from view behind the hanging plants in FIG. 6. In such implementation, those skilled in the art will appreciate that the plants will at least air-dry from being exposed to the ambient air. The drying process can be accelerated, if so desired, by complementing the air-drying process with a fan that blows air on the suspended plants, or by one or more heaters that deliver heat to the suspended plants, or the like.

Although the devices, systems, apparatus and methods have been described and illustrated in connection with certain embodiments, variations and modifications will be evident to those skilled in the art. Such variations and modifications may be made without departing from the scope and spirit of the present disclosure, and are therefore anticipated. The description and teachings herein are thus not to be limited to the precise details of methodology or construction set forth herein because variations and modification are intended to be included within the scope and spirit of the present disclosures and teachings.

I claim:

1. A hanging apparatus, comprising:
a horizontal member;
a first vertical member suspended from said horizontal member; and
a first support member adjustably connected to said first vertical member by a clamp for hanging an organic material, said first support member configured to have one end protruded out from said first vertical member and curved inwardly to securely hang said organic material, wherein:
the clamp is attached to said first vertical member by crimping around a circumference of said first vertical member and is configured to be loosened or tightened with respect to said first vertical member by use of a connection device,
said first vertical member is selectively removable from said horizontal member, and
said first support member is capable of carrying a weight of said organic material.

2. The hanging apparatus of claim 1, wherein said first vertical member is slidable with respect to said horizontal member.

3. The hanging apparatus of claim 1, further comprising:
a plurality of vertical members suspended from said horizontal member; and
each of said plurality of vertical members having at least one support member substantially rigidly connected thereto, wherein
said support members protrude out of their respective vertical member, and
said support members are capable of carrying a weight of an organic material that is hung on each of said support members.

4. The hanging apparatus of claim 3, wherein:
all of said plurality of vertical members are selectively removable from said horizontal member; and
all of said plurality of vertical members are slidable with respect to said horizontal member.

5. The hanging apparatus of claim 1, wherein said first vertical member is suspended from said horizontal member with an S-hook.

6. The hanging apparatus of claim 1, wherein said first least one support member is a C-shaped hook.

7. The hanging apparatus of claim 1, wherein said first vertical member comprises a plurality of telescoping members that telescopically slide with respect to each other.

8. The hanging apparatus of claim 7, wherein said plurality of telescoping members lock with respect to each other.

9. The hanging apparatus of claim 1, wherein said first vertical member comprises a plurality of separate sections that interconnect with each other.

10. The hanging apparatus of claim 9, wherein said plurality of separate sections threadedly interconnect with each other.

11. The drying apparatus of claim 1, further comprising a second support member and a second vertical member suspended from said horizontal member, wherein said second support member is threadedly engaged with said second vertical member.

12. The drying apparatus of claim 1, further comprising said organic material, wherein said organic material is a plant.

13. A method for drying organic material, comprising:
removably suspending a first vertical member from a horizontal member;
adjustably substantially rigidly connecting a first support member to said first vertical member by a clamp, wherein the clamp is attached to said first vertical member by crimping around a circumference of said first vertical member and is configured to be loosened or tightened with respect to said first vertical member by use of a connection device; and
hanging an organic material on said first support member, wherein said first support member is configured to prevent said organic material from slipping off from said first support member by having one end protruded out from said first vertical member and curved inwardly to securely hang said organic material.

14. The method for drying organic material of claim 13, further comprising:
removably suspending a plurality of vertical members suspended from said horizontal member; and
substantially rigidly connecting at least one support member to each of said plurality of vertical members, wherein said support members protrude out of their respective vertical member.

15. The method for drying organic material of claim 14, wherein each of said plurality of vertical members is slidable with respect to said horizontal member.

16. The method for drying organic material of claim 13, wherein:
said first vertical member is suspended from said horizontal member with an S-hook; and
said first support member is a C-shaped hook.

17. The method for drying organic material of claim 13, wherein said first vertical member comprises a plurality of telescoping members that telescopically slide with respect to each other, and further comprising the step of locking said plurality of telescoping members with respect to each other.

18. The method for drying organic material of claim 13, wherein said first vertical member comprises a plurality of separate sections that interconnect with each other, and further comprising the step of interconnecting at least two of said plurality of separate sections with each other.

19. The method for drying organic material of claim 18, wherein said plurality of separate sections threadedly interconnect with each other.

20. An apparatus for drying organic material, comprising:
a horizontal member with an elongated shape;
a first vertical member and a second vertical member, each suspended from said horizontal member, wherein:
each of said vertical members is selectively slidable with respect to said horizontal member and has a substantially elongated shape;
suspension members corresponding to each vertical member, said suspension members operable to slidably suspend their respective vertical member from said horizontal member;
a first support member adjustably connected to said first vertical members by a clamp for hanging an organic material, said first support member configured to have one end protruded out from said first vertical member and curved inwardly to securely hang said organic material; and
a second support member substantially rigidly connected to said second vertical member, said second support member is threadedly engaged with said second vertical member.

* * * * *